Figure 4:
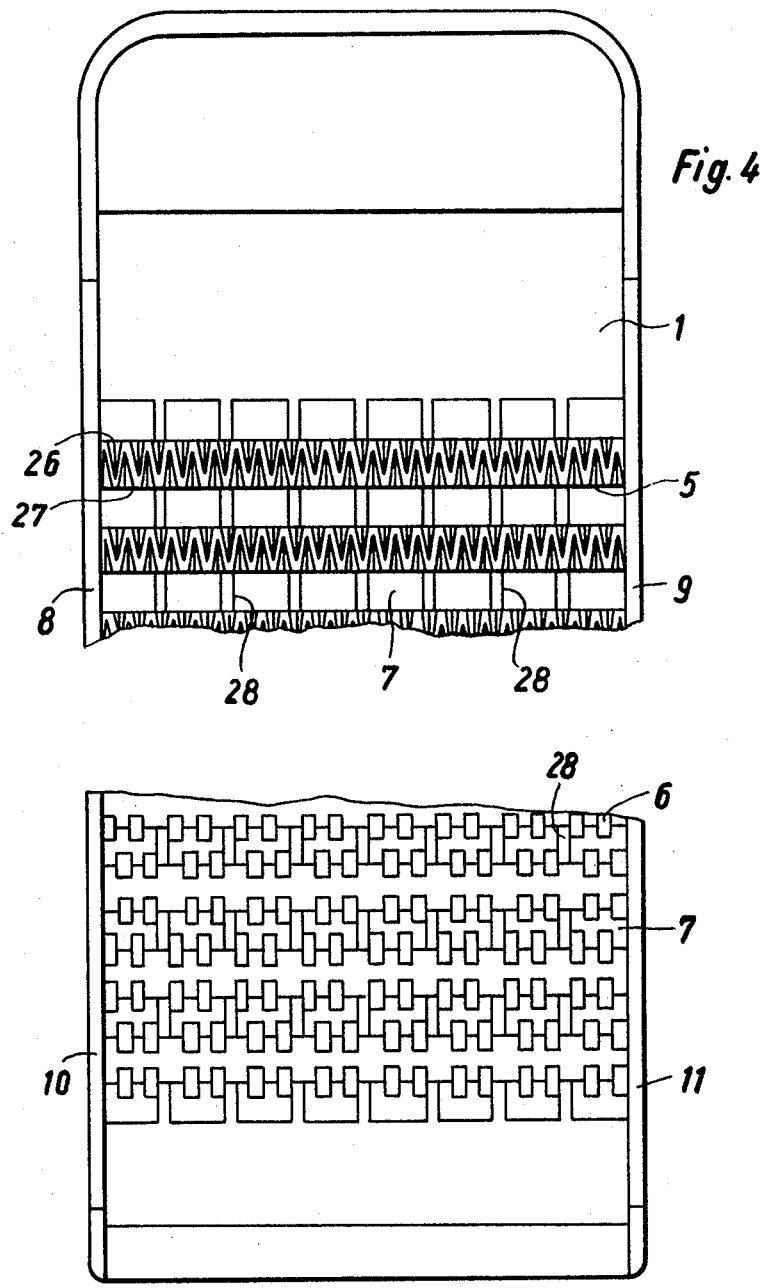

United States Patent

[11] 3,583,454

| [72] | Inventor | Alfred Börner<br>PicklieBemer Str. 6, Dudeldorf, Germany |
|---|---|---|
| [21] | Appl. No. | 787,343 |
| [22] | Filed | Dec. 27, 1968 |
| [45] | Patented | June 8, 1971 |
| [32] | Priority | Jan. 4, 1968 |
| [33] | | Germany |
| [31] | | P 17 29 908.0 |

[54] DOMESTIC APPLIANCES
13 Claims, 6 Drawing Figs.

[52] U.S. Cl. ..................................... 146/179,
146/168
[51] Int. Cl. ......................................... A47j 43/00
[50] Field of Search ............................ 146/167,
168, 169, 171, 179, 170, 180, 177, 178

[56] References Cited
UNITED STATES PATENTS

| 1,248,166 | 11/1917 | Rubenstein .................. | 146/179 |
| 2,048,750 | 7/1936 | Machotka ..................... | 146/180 |
| 2,166,622 | 7/1939 | Callen .......................... | 146/168 |
| 2,333,194 | 11/1943 | Plagens ........................ | 146/168 |
| 2,405,056 | 7/1946 | Rosenbloom ................. | 146/177 |
| 2,452,328 | 10/1948 | Schatz .......................... | 146/179 X |

Primary Examiner—Willie G. Abercrombie
Attorney—Robert W. Beach

ABSTRACT: A food-comminuting plate includes a pair of parallel rails on which a removable food-holder can be guided for reciprocation and limited rotation relative to the plate. Comminuting blades on the plate are located between the rails. The holder is a concave shell of an extent to span the rails and its hollow opens toward the comminuting plate. The shell hollow has food-impaling pins; and a plunger extends through the shell for pressing the food along the pins toward the plate as the food is reduced by comminution. The plunger and food-impaling pins are rotatable through a limited angle. Among the blades of the comminuting plate may be an elongated cutting blade having opposite ends received in slots in the rails. Such blade is adjustable relative to the general surface of the comminuting plate by mounting screws which extend through and are recessed in the rails.

Fig.1

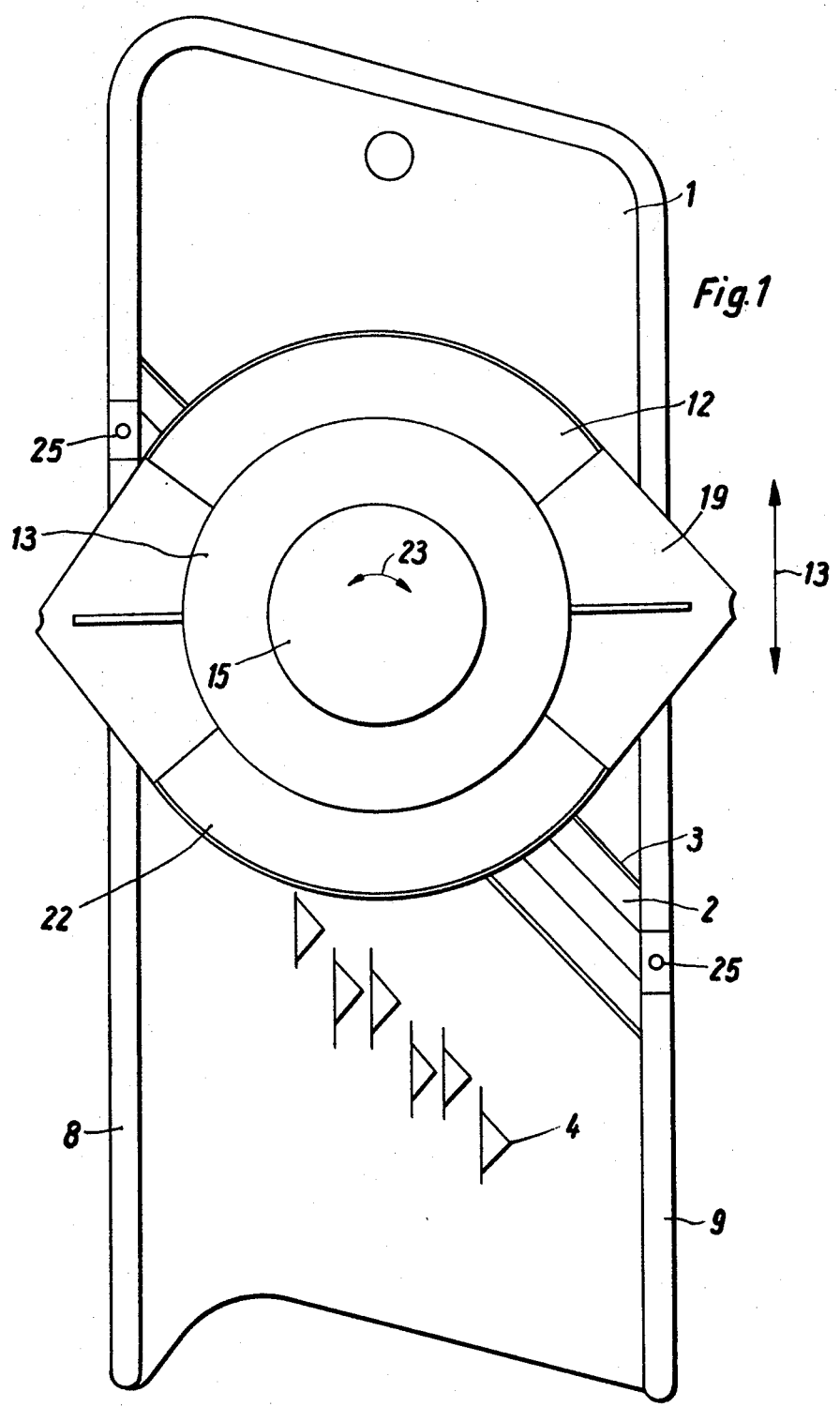

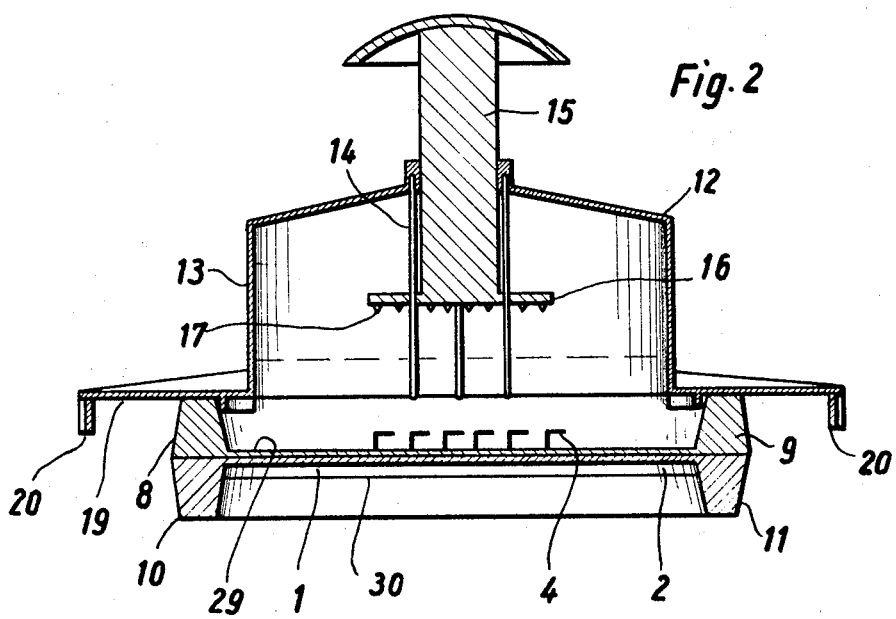
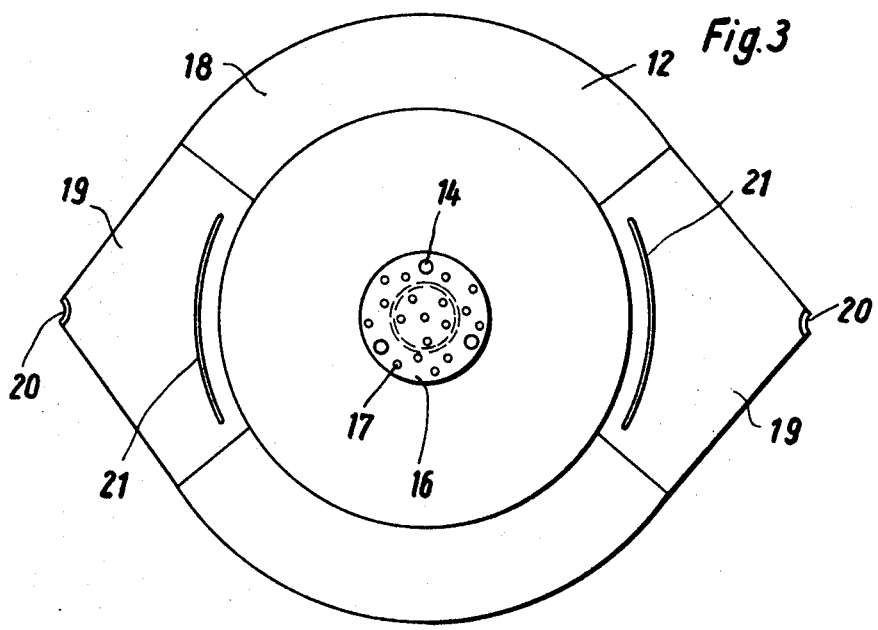

PATENTED JUN 8 1971

3,583,454

SHEET 4 OF 4

*Inventor:*
ALFRED BÖRNER
Robert W. Beach
ATTORNEY

DOMESTIC APPLIANCES

The present invention relates to a domestic appliance to be held in the hand, for cutting or grating onions, fruit, vegetables or similar foodstuffs, which consists of a working plate provided with comminuting members.

The simple domestic appliances known previously for cutting vegetables or the like are made in the form of cutting planes having one or more blades. For grating these foodstuffs, graters are known which have a number of projecting teeth. However, when using these simple domestic appliances, it often happens that the housewife cuts herself or injures her fingers, particularly when the object to be cut has become small.

It is an object of the invention to produce a simple domestic appliance which is easy to clean, which can be used without danger and with which it is possible to cut up almost all of a food article.

Figure 6:
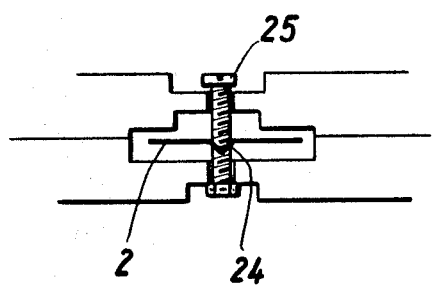
Figure 5:
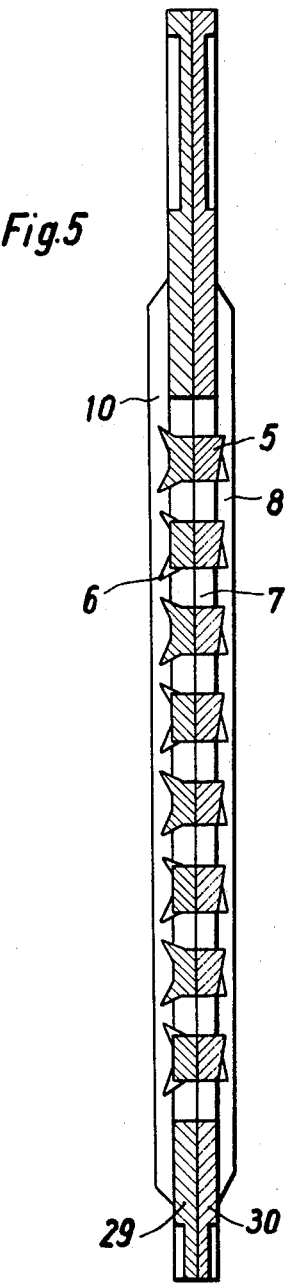

In order that the invention may be more clearly understood, reference will now be made to the accompanying drawings of preferred embodiments given by way of example, and in which:

FIG. 1 shows a plan view of a domestic appliance in the form of a cutting plate with different blades and a reciprocating holder, FIG. 2 is a section through the domestic appliance according to FIG. 1, FIG. 3 is a view from below of the holder shown in FIGS. 1 and 2, FIG. 4 is an elevation of a portion of one side and FIG. 4A is an elevation of a portion of the opposite side; of a grater on which a holder of the type shown in FIGS. 1 to 3 can be set, FIG. 5 is a longitudinal section through the grater according to FIGS. 4 and 4A, and FIG. 6 is a detail section showing the construction and means of fixing the cutting blade to the cutting plane according to FIGS. 1 and 2.

Referring now to the drawings, the domestic appliance shown consists of a working or comminuting plate 1 which may be provided with different comminuting members. Thus, according to FIGS. 1 and 2, an oblique cutting blade 2 is provided within a slot 3 for cutting slices and, separated from this, a group of hooklike hooked blades 4 is provided for cutting strips or cubes. As shown in FIGS. 1 and 2, each blade has a shank having one end connected to the plate and its opposite end carrying a cantilever projection extending parallel to the plate.

According to the embodiment of FIGS. 4 and 5, the working plate 1 may be of plastic and provided with a plurality of horizontal rows of teeth 5 and 6 arranged at a certain distance from one another. Whilst the teeth 5 are in the form of a wedge, tapering towards the center, the teeth 6 are rectangular in plan view and extend into the gaps 7, said teeth 6 tapering away from their cutting edges and towards the center of the row of teeth.

Guide strips or flanges 8 and 9 on one side of plate 1 and guide strips or flanges 10 and 11 on the other side of such plate which project beyond the comminuting members 2, 4, 5 or 6, are arranged on the two longitudinal edges of the working plate 1. A fruit holder 12 which may be moved to and fro in the longitudinal direction of the working plate 1, as indicated by an arrow in FIG. 1, may be fitted to these guide strips.

The holder consists of a concavely hollow, downwardly open housing 13 carrying a plurality of cantilever pins 14 arranged symmetrically around the center of the base of the housing. In the center of the housing a plunger 15 is mounted for reciprocation toward and away from the comminuting plate 1, which may have on its lower side a pressure plate 16 with small lugs 17.

Arcuate flanges 18 project outwardly from diametrically opposite sides of the housing and extension 19 projects oppositely from the other sides of the housing. A stop 20 is located on the lower side of each extension 19. Furthermore, a curved guide strip 21 is provided on the underside of the root portion of each of the extensions 19. The margins 22 of the annular arcuate flanges located between the extensions 19 are bent upwardly as a protection for the fingers.

The onion or other vegetable or fruit to be comminuted is placed into the housing 13 of the holder 12 whilst the plunger 15 is raised, and is thereby impaled onto the pins 14. The holder is then placed on the guide strips or flanges 8, 9, or 10, 11 in such a manner that the curved guides 21 are located inside the guide strips, whilst the extensions 19 project sideways beyond the guide strips.

Cutting or grating is effected by the holder together with the fruit to be cut, being moved to and fro in the longitudinal direction indicated by the arrow. At the same time, the plunger 15 is pressed, which in its turn, with the aid of its pressure plate 16, constantly presses the food article to be cut against the comminuting members. The curved guides 21 ensure that the holder cannot slip sideways from the working plate.

For many purposes, particularly for cutting cubed pieces with the aid of the hooked blades 4, it is advantageous if the vegetable or fruit to be cut is rotated somewhat after a cut has been made. It is therefore made possible to rotate the holder as indicated by the arrow 23 until the stops 20 engage the guide strips 8, 9, or 10, 11. The hand protecting bent margins 22 ensure that the operator's hand does not contact the blade even if it should slip from the holder.

For cutting onions in particular, it has proved successful to use a cutting plate as shown in particular in FIGS. 1 and 2. To this end, one side of the plate is provided with the hooked blades 4 whilst cutting can be effected on the other side by the cutting blade 2. This cutting blade 2 is advantageously provided with a U-shaped groove 24 as may be seen in FIG. 6. The cutting blade 2 is held at the sides by screws 25, the screws passing through said U-shaped groove 24 and this latter serving as a nut. This embodiment enables the distance between the cutting blade 2 and the working plate to be altered simply by rotating the screw 25, so that slices of different thickness can be cut.

Instead of a cutting plate as shown in FIGS. 1 and 2, a grater can also be used. The grater may have teeth on one side as shown in FIG. 4 and on the other side teeth as shown in FIG. 4A. The former teeth are staggered with respect to one another in each line 26 or 27 of a row of teeth. The teeth 6 of the other side are staggered with respect to one another from row to row. The rows of teeth are connected together by means of webs 28, and between these webs 28 are gaps 7 to allow the grated material to fall through.

In both a cutting plate corresponding to FIGS. 1 and 2 which is to be used on both sides, as well as a grater corresponding to FIGS. 4, 4A and 5, which is also to be used on both sides the working plate advantageously consists of two plastic plates 29 and 30 which are securely connected together by means of glueing or the like. The construction consisting of two plastic plates connected together has the advantage of a greater stability, as extensive tests have shown.

The hooked blades 4 are advantageously integral with the working plate 1. The working plate itself can be provided with a number of parallel longitudinal channels so that juice can flow off more easily.

What I claim is:

1. A fruit and vegetable comminuter for cutting or grating food articles, comprising a comminuting plate, a food article holder, and means guiding said food article holder for reciprocation and limited rotation relative to said comminuting plate, said food holder including a hollow housing opening toward said comminuting plate for receiving a food article therein, a plunger located in said housing, engageable with a food article therein and movable toward said comminuting plate for pressing the food article toward said comminuting plate relative to said housing and means engaged between said housing and said plunger, guiding said plunger for reciprocation relative to said housing toward and away from said comminuting plate and connecting said plunger and said housing for conjoint rotation relative to said comminuting plate.

2. The comminuter defined in claim 1, and manually engageable means located exteriorly of the housing and connected to the plunger for effecting reciprocation thereof relative to the housing.

3. The comminuter defined in claim 1, in which the comminuting plate has therein a straight slot disposed with its length inclined relative to the direction of reciprocation of the food article holder with respect to the comminuting plate, and a slicing blade located in said slot.

4. The comminuter defined in claim 3, in which the blade has a central groove on one side and a corresponding ridge on its opposite side extending lengthwise of the blade, and means engaging opposite end portions of the blade to effect movement thereof toward and away from the food article holder.

5. The comminuter defined in claim 1, in which the comminuting plate has a group of hooked blades outstanding therefrom toward the food article holder, each blade including a shank having one end connected to the comminuting plate and its opposite end carrying a cantilever projection extending generally parallel to the plate.

6. The comminuter defined in claim 1, in which the comminuting plate has a plurality of rows of teeth extending lengthwise of the direction of reciprocation of the food article holder with respect to the comminuting plate, teeth in each row being staggered relative to other teeth in that row, each tooth being in the form of a wedge having a cutting corner and tapering away from such cutting corner and the cutting corners of adjacent teeth in each row facing in opposite directions.

7. The comminuter defined in claim 6, in which each tooth is elongated in the direction of reciprocation of the food article holder with respect to the comminuting plate and the teeth are arranged in pairs with the lengths of the teeth in each pair overlapping in a direction transversely of the direction of reciprocation of the food article holder with respect to the comminuting plate.

8. A fruit and vegetable comminuter for cutting or grating food articles, comprising a comminuting plate, a food article holder, and means guiding said food article holder for movement relative to said comminuting plate in a path generally parallel to the surface of said comminuting plate, said food article holder including a hollow housing opening toward said comminuting plate for receiving a food article therein, a plunger located in said housing, engageable with a food article therein and movable toward said comminuting plate for pressing the food article toward said comminuting plate relative to said housing, and a plurality of cantilever pins located in the hollow of said housing, carried fixedly thereby and projecting therefrom toward said comminuting plate to impale a food product, movement of said plunger toward said comminuting plate stripping the food article from said pins.

9. The comminuter defined in claim 8, in which the plunger is engaged with the pins so as to prevent rotation of the plunger relative to the housing.

10. The comminuter defined in claim 9, in which the plunger has apertures therein through which the pins extend.

11. The comminuter defined in claim 8, in which the comminuting plate has spaced parallel flanges outstanding from one side thereof, the food article holder has extensions projecting from opposite sides thereof engageable with said flanges, respectively, and rotation-limiting means carried by said extensions and engageable with said flanges for enabling substantial rotative movement of the food article holder relative to the comminuting plate, but limiting such relative rotational movement.

12. The comminuter defined in claim 11, in which the extensions taper away from the housing to tips, the root portion of each extension having an arcuate strip engageable with a flange of the comminuting plate for guiding rotation of the food article holder relative to the comminuting plate, and the rotation-limiting means are mounted on the tips of the extensions.

13. The comminuter defined in claim 8, and article-engaging means carried by the plunger and engageable with a food article to deter movement of the food article relative to the plunger in a direction transversely of the direction of plunger movement toward the comminuting plate.